E. OWERS, F. C. PEARSON AND A. W. BERNDT.
LAMINAR SUSPENSION OR SHOCK ABSORBING SPRING FOR USE ON VEHICLES AND AIRCRAFT.
APPLICATION FILED JULY 16, 1920.

1,388,525.

Patented Aug. 23, 1921.

Inventors.
Ernest Owers
Francis C. Pearson
Arthur W. Berndt
by Heard Smith & Tennant.
Attys.

UNITED STATES PATENT OFFICE.

ERNEST OWERS, FRANCIS CLARE PEARSON, AND ARTHUR W. BERNDT, OF LONDON, ENGLAND.

LAMINAR SUSPENSION OR SHOCK-ABSORBING SPRING FOR USE ON VEHICLES AND AIRCRAFT.

1,388,525.     Specification of Letters Patent.     Patented Aug. 23, 1921.

Application filed July 16, 1920. Serial No. 396,727.

*To all whom it may concern:*

Be it known that we, ERNEST OWERS, FRANCIS CLARE PEARSON, and ARTHUR WILLIAM BERNDT, subjects of the King of Great Britain and Ireland, residing at 2 Ingleby road, Holloway, London, N. 7, England, have invented a new and useful Improvement in Laminar Suspension or Shock-Absorbing Springs for Use on Vehicles and Aircraft, of which the following is a specification.

This invention has reference to improvements in and relating to laminar suspension or shock-absorbing springs for use on vehicles and aircraft, and it comprises a novel construction of springs and a method of mounting same.

Our improved spring resembles the ordinary semi-elliptic type of carriage spring in that it is composed of a major leaf intended to bear yieldingly at its ends and a plurality of reinforcing leaves mounted thereon, or thereunder, but it has much greater flexibility and accommodates itself to varying loads more readily than an ordinary semi-elliptic spring composed of a like number of similar leaves, while it has a great advantage over such spring in that it practically absorbs all road shocks, however, sudden, without any violent reaction. As is well known, the ordinary semi-elliptic spring does not yield readily, and reacts somewhat violently after being subjected to a sudden shock.

In a spring constructed in accordance with our invention the leaves bear directly upon each other at one end, like the leaves of an ordinary carriage spring, but they are spaced apart at their other ends and the load or thrust is taken by the free end of a bearing plate which is bolted or otherwise firmly fastened upon the central or body portion of the spring and projects over the separated ends of the leaves so that it acts under the load or thrust to bring the said separated ends into action successively.

We have illustrated an embodiment of our invention in the accompanying drawing, in which:—

In the construction illustrated, the leaves of the spring are spaced apart by short packing pieces of any suitable material, which preferably taper in thickness toward their ends. A plate A is mounted upon the shortest leaf, and this plate is firmly secured upon the body portion of the spring by a bolt *a* which passes through a hole formed in the superposed leaves and packing pieces. One end of this plate A, hereinafter referred to as the bearing plate, is provided with a stirrup or clamp *b* which embraces the leaves closely and, with or without the aid of an additional clip *c*, maintains them in contact with each other at that end of the spring, and the other end of the said bearing plate projects beyond the packing pieces and above the free, separated ends of the leaves.

Figure 1:
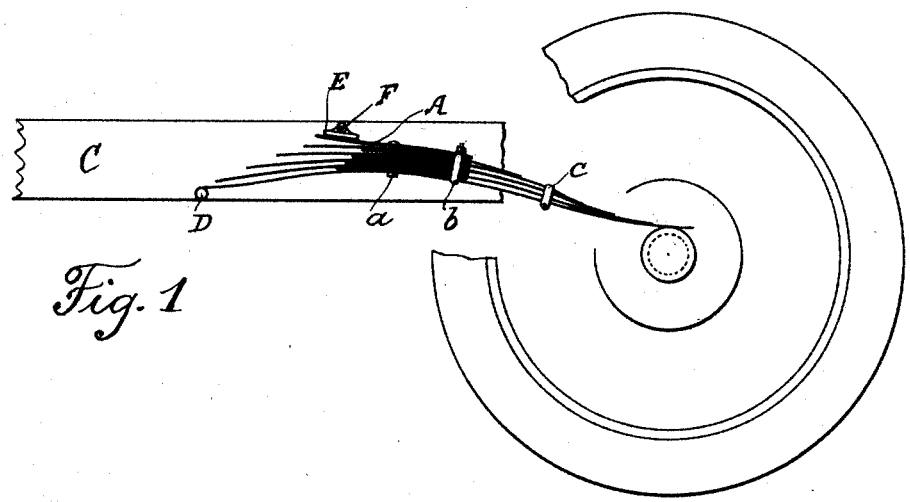
Figure 1 is a side elevation of a spring constructed and mounted in accordance with our invention, part of the chassis of a motor car, the rear-axle, and part of a wheel mounted on the said axle being shown diagrammatically.
Figure 2:
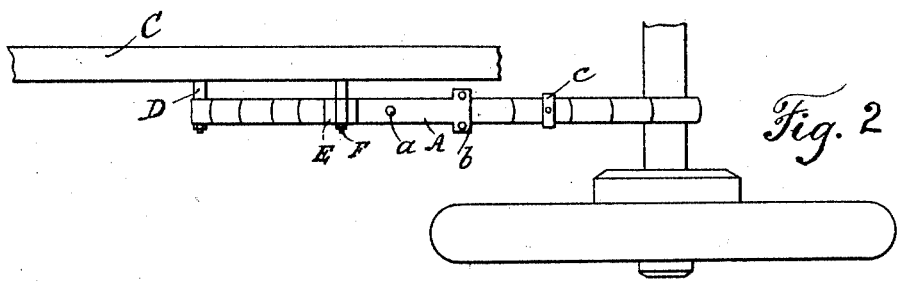
Fig. 2 is a plan view of Fig. 1.

The major leaf of the spring is shown in Figs. 1 and 2 as pivoted at one end on the frame of a chassis C on a bolt D, at the end at which the leaves are separated, and as bearing at its other end upon the rear axle of the chassis; and the free-end of the bearing plate A bears against a block E which is pivotally mounted on a bolt F on the chassis and accommodates itself readily to the inclination of the said plate; but this arrangement may be varied in many ways, for instance, a roller may be substituted for the pivoted block E, or the said block and the bolt D may take the place of each other, the free end of the bearing plate being in that case formed with a rolled eye.

Figure 3:
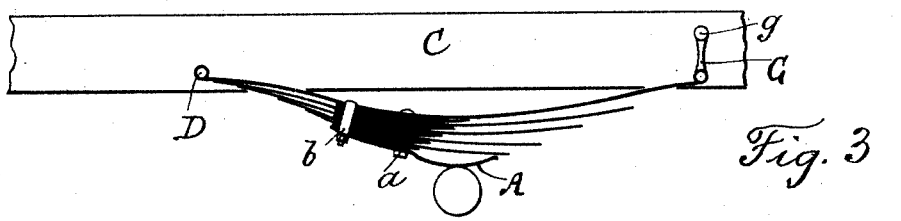
Fig. 3 shows another way of mounting the spring.
Figure 4:
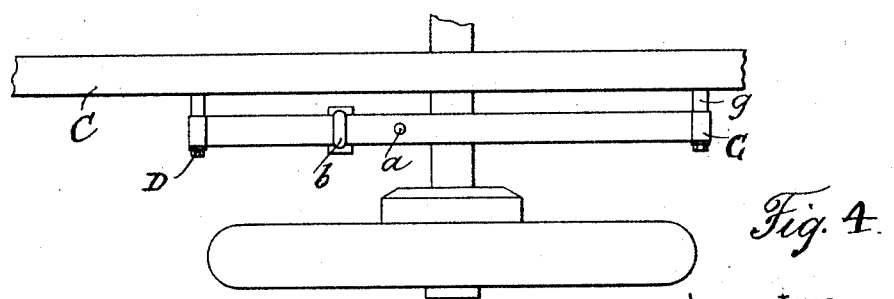
Fig. 4 is a plan view of Fig. 3 with the addition of a wheel mounted on the axle.

In Figs. 3 and 4 the spring is shown reversed, and the construction is varied slightly. The major leaf is pivoted at one end on the chassis as in Fig. 1, and carried at its other end by swiveling links G mounted on a bolt *g* which projects from the chassis; and the bearing plate A bears upon the axle—to which it may be attached in any suitable manner.

In each arrangement, relative vertical movements of the chassis and the axle are cushioned by the separated ends of the leaves of the spring being brought into action successively.

We claim:—

1. A laminar spring comprising a major leaf extending from one end to the other of the spring and adapted to bear yieldingly at its ends, a plurality of superposed reinforcing leaves arranged with one end of each leaf bearing directly on the next adjacent leaf and with the other ends of the leaves normally separated, and a bearing plate rigidly secured upon the superposed reinforcing leaves and having a free end separated from the leaves and projecting over the separated ends thereof, said free end of the bearing plate being adapted to receive the load.

2. A laminar spring comprising a major leaf extending from one end to the other thereof, a plurality of superposed reinforcing leaves of different lengths, means for securing said reinforcing leaves to the major leaf so that one end of each reinforcing leaf bears directly on the adjacent leaf while the other ends of the reinforcing leaves are normally separated from each other, and a bearing plate rigidly secured to the superposed reinforcing leaves and having a free end separated from and projecting over the separated ends of the reinforcing leaves.

3. A laminar spring comprising a major leaf extending from one end to the other of the spring, a plurality of superposed reinforcing leaves, spacing elements interposed between said reinforcing leaves, means connecting said reinforcing leaves to the major leaf and coöperating with the spacing elements to hold one end of each reinforcing leaf in direct engagement with the adjacent leaf and the opposite ends of the reinforcing leaves separated from each other, and a bearing plate rigidly secured at one end to the reinforcing leaves and having a free end extending over but spaced from the separated ends of the reinforcing leaves, said free end being adapted to receive the load, whereby when the load is applied to the spring through the bearing plate the separated ends of the reinforcing leaves will be brought together successively.

ERNEST OWERS.
FRANCIS CLARE PEARSON.
ARTHUR W. BERNDT.

Witnesses:
HENRY IMRIE,
GLADYS SHREWSBURY.